Patented Sept. 4, 1945

2,384,070

UNITED STATES PATENT OFFICE 2,384,070

MILLING RESINS WITH THIOLS

Elmer Keiser Bolton, Wilmington, Del., assignor to E. I. du Pont de Nemours & Company, Wilmington, Del., a corporation of Delaware No Drawing. Application July 15, 1940, Serial No. 345,623

6 Claims. (Cl. 260—83)

This invention relates to the treatment of polymeric materials.

This invention has as an object the provision of a process whereby mechanical work on methyl methacrylate polymers in the plastic state may be easily and speedily carried out. A further object is the provision of a process whereby solutions of polymeric methyl methacrylate of greatly increased solids content may be worked readily without substantially altering the strength or other physical properties of the polymeric methyl methacrylates.

Another object is the provision of a process whereby the melt and solution viscosity of methyl methacrylate polymers are greatly reduced. A still further object embraces methyl methacrylate polymers of reduced melt and solution viscosity and compositions prepared therefrom. Other objects will appear hereinafter.

These objects are accomplished by the following invention wherein polymeric methyl methacrylate is worked mechanically with a small quantity of an organic thiol in a device capable of doing internal work such as a differential or even speed rolling mill or masticator mixer such as a Banbury mixer.

In the preferred embodiment of this invention the polymeric methyl methacrylate is preheated until softened and plastic but not melted. This plastic material is then worked on a differential speed rolling mill with 1 to 2% by weight of an organic thiol. The rolls are heated at a temperature just sufficient to maintain the polymer in the plastic state. Milling is continued for a short time until a considerable decrease in the viscosity of the plastic mass has taken place and it has been rendered more uniform.

Polymeric methyl methacrylates so treated are especially suitable for injection molding. In comparison with methyl methacrylates not so treated, they flow much more readily, in this operation, under given conditions of temperature and pressure. The difficulty of softening certain of these untreated materials has in the past led to the application of temperatures so high as to cause blisters, bubbles, and shrinkage marks in the articles so molded. Treatment of such materials in accordance with the present invention improves their flow characteristics to such a degree that, in compression or injection molding at a given pressure, much lower temperatures suffice to impart adequate mobility. Correspondingly, these defects in the molded article are avoided, and the article constitutes a perfect and faithful reproduction of the cavity of the mold.

A solution of such a treated polymeric methyl methacrylate in a suitable organic solvent has a remarkably lower viscosity than a similar solution of the polymer similarly milled but without the organic thiol. Thus coating compositions prepared from polymeric methyl methacrylates treated according to this invention can be prepared with much higher solids content and still may be brushed or sprayed readily. This not only effects a saving in solvent required but also reduces the number of coats required to build up a given thickness and thus reduces the time and expense of coating.

If it is desired to incorporate in the polymeric methyl methacrylate any dye, pigment, or filler, such modifier is suitably added at the same time as the thiol or subsequently, the thiol permitting uniform dispersion of the modifier in the polymer within 5 to 10 minutes. Dispersion of such modifiers by milling without the thiol requires 5 to 10 times as long.

The more detailed practice of the invention is illustrated by the following examples, wherein parts given are by weight. There are of course many forms of the invention other than these specific embodiments.

Example I

One hundred parts of methyl methacrylate granular polymer is preheated at 125° C. The polymer is placed on a differential speed rolling mill, the rolls of which are heated at 125° C. As soon as the polymer is spread on the rolls and is milling smoothly, one part of xylyl mercaptan is added and milling continued for 5 minutes. The polymer is then sheeted from the hot roll. The viscosity of a solution of 25 parts of this treated polymer in 75 parts of toluene is 5.50 poises at 25° C. whereas the viscosity of a solution of the same batch of methyl methacrylate polymer milled as above but without the xylyl mercaptan has a solution viscosity of 15.2 poises at 25° C. To produce a reduction in solution viscosity to 5.50 poises as above by milling alone requires 45 to 50 minutes.

When the above process is repeated using 1 part per 100 of organic thiols other than xylyl mercaptan the following viscosities of the treated methacrylate polymer in 25% solution in toluene are observed:

| Thiol | Viscosity of 25% solution in toluene |
|---|---|
| | Poises |
| Thio-beta-naphthol | 8.84 |
| Thiophenol | 6.27 |
| Octadecylthiophenol (o-p-mixture) | 5.50 |
| Dodecyl mercaptan | 8.84 |
| Pentadecanethiol-8 | 10.7 |
| Pinane mercaptan | 5.50 |
| 2-mercaptothiazoline | 4.70 |
| Thiourea | 12.9 |

A particularly advantageous use of the process of this invention is in connection with the reworking of scrap methyl methacrylate polymer containing cast resin of high molecular weight. The high viscosity of such scrap resin has greatly limited its utilization. To reduce its viscosity, by rolling, down into the range required for use in molding compounds requires so long a treatment that it has been found more economical not to attempt it, but rather to recover the scrap in the form of monomer by cracking. The presence of a thiol makes it possible to shorten this rolling treatment so much as to make it economical. In this way, cast scrap can be used in the manufacture of molding compounds. This use is illustrated below.

Example II

Cast scrap of polymethyl methacrylate, containing approximately 10 per cent of diamyl phthalate, and having an average molecular weight of approximately 85,000 as determined by dilute solution viscosity measurement is softened by heat and loaded upon mixing rolls. The temperature of the front roll is approximately 320° F. and that of the back roll about 250° F. To this material is added, on the rolls, 4 per cent of octadecyl alcohol and 0.1 per cent of thio-beta-naphthol. From the time when the mass has become consolidated and is rolling normally, rolling is continued for ten minutes. The product is drawn from the rolls, cooled and comminuted to a granular molding powder. Its average molecular weight is now 35,000. It flows satisfactorily in an injection-molding press and yields molded articles which are faithful reproductions of the mold cavity.

The operating conditions for carrying out this invention are not limited to those outlined in the preceding examples. The temperature at which the milling is carried out is selected with respect to the particular polymer being treated and is chosen anywhere in the range in which the polymer is "plastic" and may be kneaded by the action of the mill. Any higher temperature in this range may be used short of that which causes objectionable depolymerization of the polymer. In general the temperature may be varied from room temperature to 200° C. depending on the softening range of the particular polymer to be treated.

The time of milling after addition of the thiol may also be extended beyond the limit used in the examples. Continued reduction in viscosity takes place up to 2 or 3 hours of milling although rapid reduction in viscosity takes place within 10 minutes and after this time the reductions diminish progressively.

In the process of this invention any organic thiol effectively stable and non-volatile at the milling temperature, i. e., stable and non-volatile enough so that 1 to 2% of the thiol remains in the plastic mix until the viscosity is reduced to the desired extent, including benzyl mercaptan, thiobenzoic acid, thiocresols, thioacetic acid, thioformamides HCSNHR, cysteine, thioglycolic acid, thioglucose, thiohydantoin, thiostearic acid, isohexyl mercaptan, octadecyl mercaptan, etc. may be employed. Thus there may be used any such organic substance which includes in its structure a configuration in which a divalent sulfur atom has one of its valences bound to a carbon atom and the other to a hydrogen atom or those substances capable of enolizing or otherwise isomerizing to produce such a configuration under the conditions in which this invention is carried out. Thus there are included not only such materials as the alkyl mercaptans, thiophenols, thionaphthols, etc., but also such compounds as thiourea, the formula of one of the tautomers of which is $NH_2-CSH=NH$. (Whitmore, page 534.)

While any organic thiol effectively stable and effectively non-volatile at the working or milling temperature will bring about a reduction in melt and solution viscosity according to the invention, there are several classes in which the effect produced is particularly marked, i. e., thiols of aliphatic hydrocarbons, thiols of aromatic hydrocarbons, especially thiophenols and thionaphthols, and the thiols of the thiazolines.

Of the thiols of aliphatic hydrocarbons, the members which produce the greatest reduction in viscosity are those in which the thiol group is attached to a terminal carbon atom and in which the molecule contains 10 or more carbon atoms.

Of the thiols of aromatic hydrocarbons, the members producing greatest viscosity reductions are thio-beta-naphthol, thiophenol and xylyl mercaptan.

Of the thiols of the thiazolines, 2-mercaptothiazoline is preferred because of its most pronounced effect on the viscosity of polymers treated according to this invention.

Amounts of the thiols from about 0.01% to about 5% by weight based on the weight of polymeric materials may be used in the practice of this invention. Best results are obtained when at least 0.1% thiol is employed and it is rarely necessary to use more than 2% so that the preferred range is from 0.1% to 2.0% thiol.

The milling step is conveniently carried out upon heated mixing rolls of which the two members may be equally or unequally heated and/or run at equal or unequal speeds. It may, however, be conducted in other equipment such as a WP mixer, a Banbury mixer, or a screw stuffer, e. g., of the type used in a tubing machine and in general any apparatus capable of giving the mass a shearing action.

The process of this invention is of use in the preparation of polymeric materials for injection molding. Thus, when methyl methacrylate is polymerized in aqueous dispersion, the polymer is often extremely viscous in the plastic state, and therefore difficult to force into the smaller parts of an injection mold. Treatment of such a polymer by the process of the present invention reduces its viscosity in the plastic state and greatly improves its flow into an injection mold thereby producing a molded object containing fewer internal strains, this decrease in strain being evidenced by a substantial decrease in tendency of the object to distort at temperatures lower than its nominal softening point.

The process of this invention also effects a saving of time and expense in the process of improving the uniformity of polymeric materials, especially where the optical properties of the material are important, as in the preparation of plastic lenses, safety glass interlayers, sun glasses, etc. Milling polymethyl methacrylate for these uses often requires several hours to bring about satisfactory uniformity, whereas by means of this invention such milling time is reduced to 5 to 10 minutes.

Another advantage is attained in the incorporation of pigments and fillers into the polymeric material. It is frequently necessary to mill such compositions for long periods of time in order to prevent a mottled appearance in articles prepared from such filled or pigmented polymers. The present invention greatly reduces the milling required for uniform dispersion of pigments and fillers in polymeric methyl methacrylates. Further advantages of this invention are that it may be used to treat scrap from cast resin of high viscosity to make the same suitable for reuse in molding powder and that it may be used in connection with any process wherein the plastic is forced through a narrow channel or orifice as in injection molding and other extrusion methods, e. g., in the forming of tubes, rods, etc.

The reduction of solution viscosity which is characteristic of polymeric methyl methacrylate treated according to the present invention is especially useful in preparing coating compositions from the treated polymers. The lower solution viscosity permits the incorporation of larger percentages of the polymers in solution and still yields a composition which can readily be applied by the conventional methods such as brushing, spraying, etc. The net result is that when the solvent is removed, a much heavier coating has been applied and the number of coats required is thus materially reduced.

The term "homopolymeric" is used as in Ellis, The Chemistry of Synthetic Resins (1935) at page 43, to indicate a polymer wherein the units are all alike, i. e., in this case made up of methyl methacrylate units.

The above description and examples are intended to be illustrative only. Any modification of or variation therefrom which conforms to the spirit of the invention is intended to be included within the scope of the claims.

What is claimed is:

1. Process which comprises milling resinous, homopolymeric polymethyl methacrylate at a temperature at which the polymer is plastic and in the range 125°–200° C. with an organic thiol effectively stable and non-volatile at the milling temperature until a substantial decrease in the solution viscosity of the polymer in 25% solution in toluene is obtained.

2. Process which comprises milling a resinous, homopolymeric methyl methacrylate polymer at a temperature at which the polymer is plastic and in the range 125°–200° C. with dodecyl mercaptan until a substantial decrease in the solution viscosity, of the polymer, in 25% solution in toluene is obtained.

3. A resinous, homopolymeric methyl methacrylate polymer of reduced solution viscosity in 25% solution in toluene having an organic thiol effectively stable and non-volatile at milling temperature milled therein at 125°–200° C. until the solution viscosity in 25% solution in toluene is substantially reduced.

4. Process which comprises milling a resinous, homopolymeric ester of methacrylic acid at a temperature at which the polymer is plastic and in the range 125°–200° C. with an organic thiol effectively stable and non-volatile at the milling temperature until the solution viscosity of the polymer in 25% solution in toluene is reduced at least 50%.

5. Process which comprises milling resinous, homopolymeric polymethyl methacrylate at a temperature within the range 125°–200° C. with an organic thiol effectively stable and non-volatile at the milling temperature until the solution viscosity of the polymer in 25% solution in toluene is reduced at least 50%.

6. Process which comprises milling resinous, homopolymeric polymethyl methacrylate at a temperature within the range 125°–200° C. with dodecyl mercaptan until the solution viscosity of the polymer in 25% solution in toluene is reduced at least 50%

ELMER KEISER BOLTON.